UNITED STATES PATENT OFFICE.

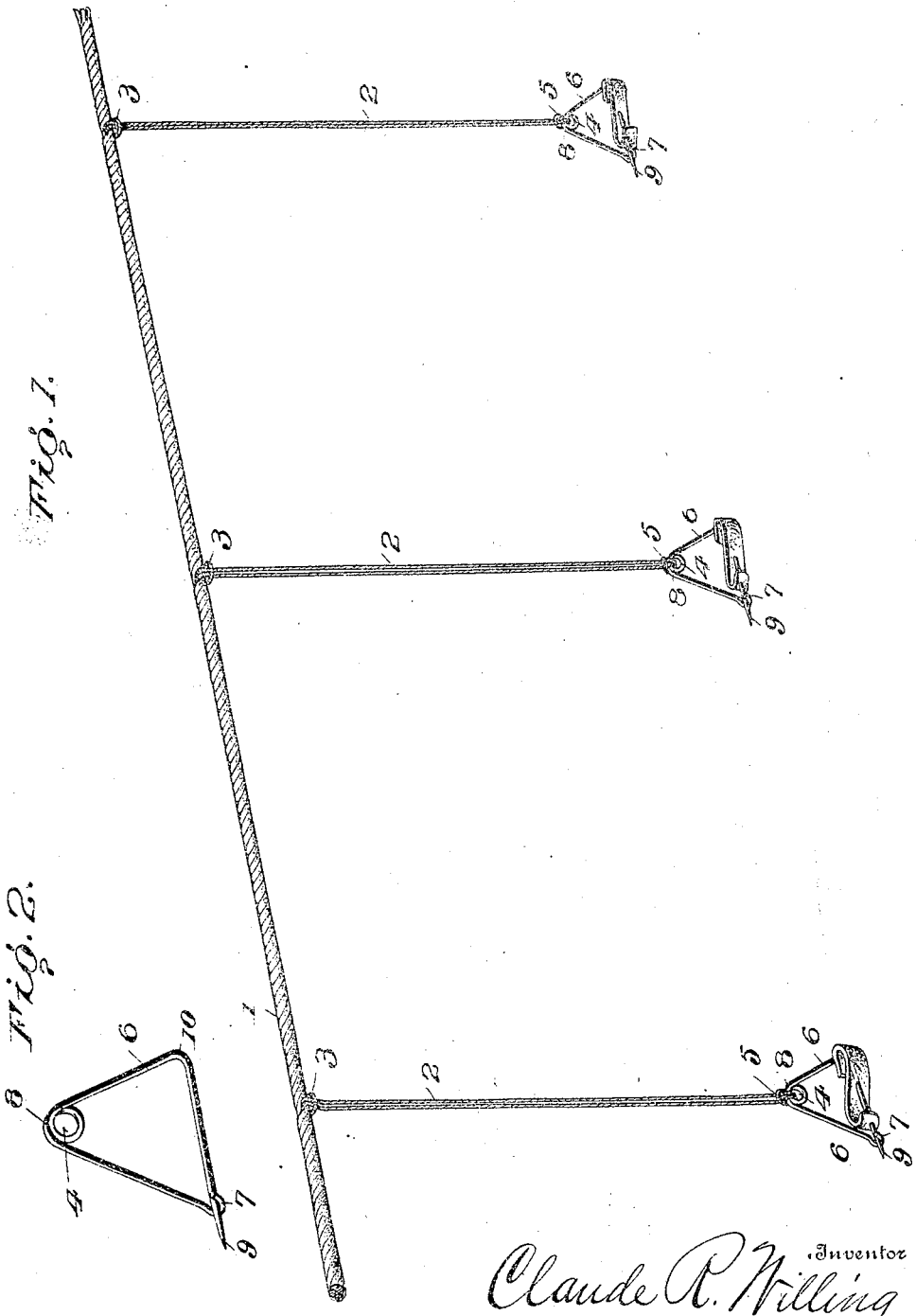

CLAUDE R. WILLING, OF NANTICOKE, MARYLAND, ASSIGNOR OF ONE-HALF TO ROBERT H. YOUNG, OF NANTICOKE, MARYLAND.

FISHING-TACKLE.

No. 843,651.     Specification of Letters Patent.     Patented Feb. 12, 1907.

Application filed July 16, 1906. Serial No. 326,349.

*To all whom it may concern:*

Be it known that I, CLAUDE R. WILLING, a citizen of the United States, residing at Nanticoke, in the county of Wisconico and State of Maryland, have invention certain new and useful Improvements in fishing-Tackle, of which the following is a specification, reference being had therein to the accompanying drawings.

My invention relates to fishing-tackle, and more particularly to bait-holding hooks adapted for use in catching crabs and other crustaceans of like nature, one of the objects being to provide a hook that will be simple and inexpensive in construction and effectual in operation and by means of which bait may be securely held against the attack of the crabs, the hook being so constructed that the bait may be easily placed thereon or taken off by the operator.

Other objects and advantages of the invention, as well as the structural features by means of which they are attained, will be apparent from the specification, taken in connection with the accompanying drawings, in which like reference-numerals designate corresponding parts, and in which—

Figure 1 is a perspective view of my complete device, and Fig. 2 is a perspective view of a hook constructed in accordance with my invention.

1 designates a trot-line of the ordinary well-known construction, and 2 an endless cord, known among fishermen as a "noose," which said cord is connected with the trot-line by passing it between the strands of the line and passing the other end through the loop to form a noose-knot, as shown at 3. The free end of the noose is then passed through an eyelet 4 of the hook and secured by a similar noose-knot 5. The hook 6 comprises a single strand of wire having a hook 7 formed integral with one end and coiled upon itself, as at 8, to form the eyelet 4, and a short distance from the other end, which is sharpened, at at 9, so as to enable the bait to be readily and easily impaled thereon, the wire is bent at an angle, as at 10, so that when completed the hook is substantially triangular in shape, as shown.

The wire comprising the hook is preferably steel, so as to render it resilient in order that when the sharp end 9 is placed in the hook 7 it bears against the same and when released extends in a downward direction to enable the operator to transfix the bait thereon, as shown in Fig. 1. After the bait has been placed on the hook the sharp point 9 is then replaced in the hook 7. As many of the endless noose cords and hooks may be connected with the trot-line as the operator may desire, and of course it is obvious they may be placed any suitable distance apart.

From the foregoing it is thought the construction, operation, and advantages of the invention will be obvious and further description is not deemed necessary.

Having thus described my said invention, what I claim as new, and desire to secure by Letters Patent of the United States, is—

The herein-described bait-holder comprising a triangular-shaped body constructed of a single strand of resilient wire and having a line-engaging eye at one of its angles formed by coiling the strand upon itself, an integral hook at another of its angles formed by bending one end of the strand upon itself, and a pointed bait-receiving pin projecting from the third angle of the triangular-shaped body and adapted to engage said hook, substantially as shown and for the purpose set forth.

In testimony whereof I hereunto affix my signature in presence of two witnesses.

CLAUDE R. WILLING.

Witnesses:
JOHN T. ROBERTS,
JOHN W. GREENE.